United States Patent
Fang et al.

(10) Patent No.: US 7,738,653 B2
(45) Date of Patent: Jun. 15, 2010

(54) METHOD FOR SELECTING IMPEDANCE SETTING FOR LOOP START TRUNK LINE

(75) Inventors: Yonghua Fang, Ottawa (CA); Mirjana Popovic, Ottawa (CA); Dieter Schulz, Dunrobin (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 859 days.

(21) Appl. No.: 11/608,177

(22) Filed: Dec. 7, 2006

(65) Prior Publication Data

US 2007/0127697 A1 Jun. 7, 2007

Related U.S. Application Data

(62) Division of application No. 11/060,514, filed on Feb. 16, 2005, now Pat. No. 7,215,762.

(30) Foreign Application Priority Data

Mar. 4, 2004 (GB) .................... 0404911.0

(51) Int. Cl.
    *H04M 9/00* (2006.01)
(52) U.S. Cl. .............. 379/398; 379/345; 333/17.3; 333/32; 333/124; 333/100; 333/135
(58) Field of Classification Search ........... 379/345, 379/398; 333/17.3, 32, 124, 100–135
See application file for complete search history.

(56) References Cited

U.S. PATENT DOCUMENTS

| | | | |
|---|---|---|---|
| 3,982,080 A | 9/1976 | Ukeiley | |
| 4,096,361 A | 6/1978 | Crawford | |
| 4,395,599 A | 7/1983 | Seidel | |
| 5,249,225 A | 9/1993 | Williams | |
| 5,333,194 A | 7/1994 | Caesar | |
| 5,398,282 A | 3/1995 | Forrester et al. | |
| 6,185,280 B1 | 2/2001 | Jarboe et al. | |
| 6,208,732 B1 | 3/2001 | Moschytz et al. | |
| 6,400,822 B1 | 6/2002 | Anozie | |

FOREIGN PATENT DOCUMENTS

| | | |
|---|---|---|
| EP | 0155571 | 1/1985 |
| EP | 05251210.0 | 5/2005 |
| GB | 2076262 | 6/2000 |
| GB | 0404911.0 | 7/2004 |
| JP | 60001929 | 8/1985 |

OTHER PUBLICATIONS

M. Peard; ECHO Return Loss Compensation by Switched Filters; May 1977; pp. 4640-4641; IBM Technical Disclosure Bulletin.

*Primary Examiner*—Curtis Kuntz
*Assistant Examiner*—Yosef K Laekemariam

(57) ABSTRACT

A method of selecting an optimum impedance for a loop start trunk line, comprising successively applying respective ones of a plurality of impedance settings to the loop start trunk line, for each impedance setting measuring the impulse response of the trans-hybrid echo path by applying audio test signals to obtain a time-domain trans-hybrid transfer function and deriving a frequency-domain spectrum representative of trans-hybrid loss, and then calculating figure of merit of the transfer function based on the power spectrum. Once all impedance settings have been tested, the optimum impedance is selected as the impedance setting associated with the highest calculated figure of merit.

4 Claims, 2 Drawing Sheets

METHOD FOR SELECTING IMPEDANCE SETTING FOR LOOP START TRUNK LINE

FIELD OF THE INVENTION

The present invention relates generally to communication systems, and more particularly to a method of selecting the best impedance setting for a loop start (LS) trunk line between a Private Branch Exchange (PBX) and Central Office (CO).

BACKGROUND OF THE INVENTION

The signal path between two telephones, involving a call other than a local one, requires amplification using a four-wire circuit. The cost and cabling required discourage extending a four-wire circuit to a subscriber's premise (i.e. Private Branch Exchange (PBX)) from the local exchange or Central Office (CO). For this reason, the four-wire circuits are coupled to two-wire circuits, using a device called a hybrid. Thus, when a PBX is connected to the CO through a Loop-Start (LS) Trunk Line, the hybrid couples the analog signal from the four-wire circuit (where incoming and outgoing signals are separated) to the two-wire circuit where the incoming and outgoing signals are combined.

Unfortunately, the hybrid is by nature a leaky device. As signals pass from the four-wire to the two-wire portion of the network, the energy in the four-wire section is reflected back, creating an echo of the signal. The intensity of the echo depends on how well the impedance is matched between both sides of the hybrid. The impedance of the two-wire circuit can vary wildly depending on factors including the line set-up in the CO equipment, the distance between CO and PBX, the electrical characteristics of the wire, etc. Provided that the total round-trip delay occurs within just a few milliseconds, the echo generates a sense that the call is 'live' by adding sidetone, thereby making a positive contribution to the quality of the call.

In cases where the total network delay exceeds 36 ms, however, the positive benefits disappear, and intrusive echo results. The actual amount of signal that is reflected back depends on how well the balance circuit of the hybrid matches the two-wire line. In the vast majority of cases, the match is poor, resulting in a considerable level of signal being reflected back.

It is known in the art to employ adaptive filtering to address hybrid echo cancellation. Normalized Least Mean Square (NLMS) adaptive filtering is one method, popular in echo cancellation, to address reflections in Voice-Over-IP (VOIP) systems.

Clearly, a well-matched four-wire circuit gives little echo and makes the echo-canceling task easier. However, the selection of a best set of matching impedance settings for a specific LS Trunk Line is currently very objective, mainly based on experience using trial and error. Such manual measurement consumes enormous human effort and time. Traditionally, a compromise setting is used that attempts to match a wide range of impedances, sacrificing overall ERL (echo return loss).

In the fields of DSL and ISDN (broadband access) techniques have been used to measure line characteristics, but for different purposes (e.g. to improve the DSL modem performance). Some prior art approaches are set forth in EP1357702, US2003173399 and US2003021391.

SUMMARY OF THE INVENTION

According to the present invention, a method is provided for measuring the impulse response of the trans-hybrid echo path and selecting the best impedance setting based on the results of an algorithm for calculating merits. More specifically, the method comprises first measuring the trans-hybrid transfer function to characterize how well the impedance setting is matched, and then calculating a figure of merit of the transfer function based on the power spectrum of the frequency-domain transfer function.

The method of present invention is particularly advantageous when either the number of candidate impedance settings or the number of LS Trunk Lines increases. In contrast with the known prior art, the method of the present invention minimizes the echo reflected by the line hybrid for voice purposes.

BRIEF DESCRIPTION OF THE DRAWINGS

An embodiment of the present invention will now be described, by way of example only, with reference to the attached Figures, wherein.

DETAILED DESCRIPTION OF THE INVENTION

Figure 1:
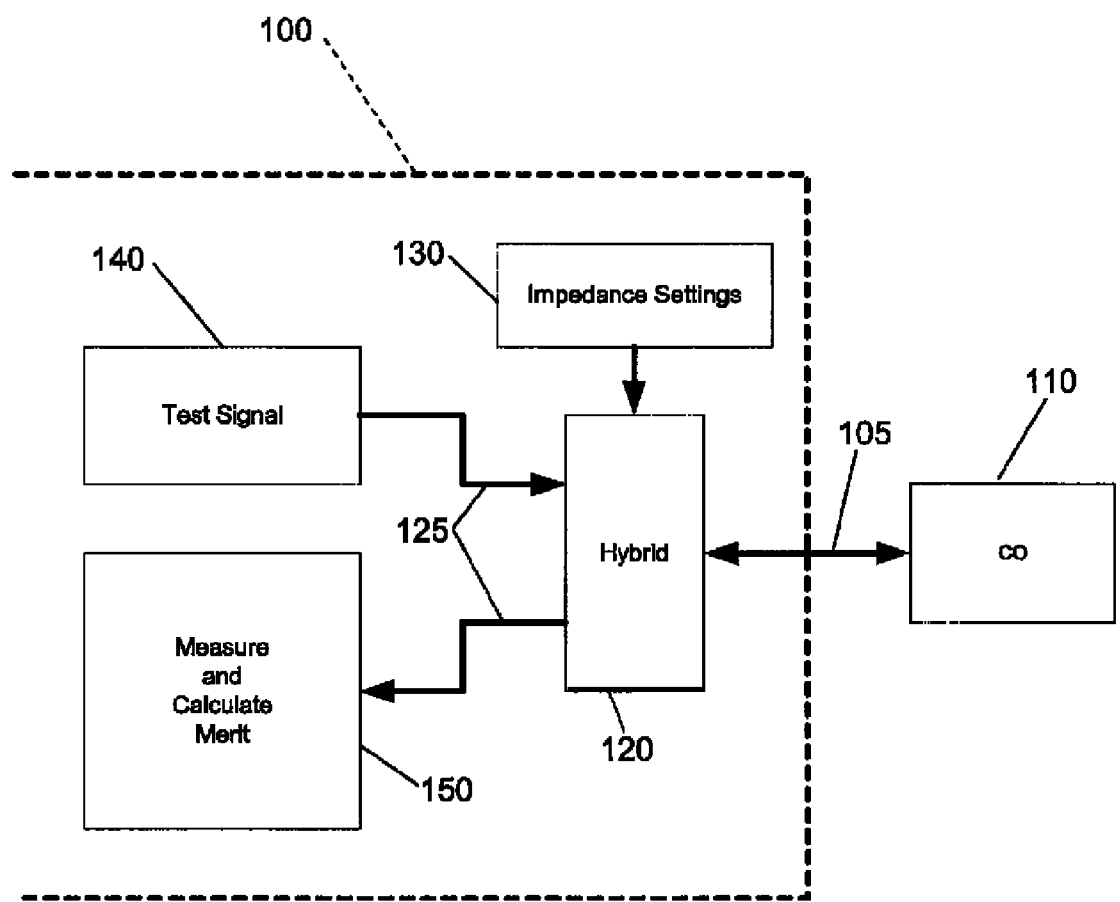
FIG. 1 is a schematic representation of a test configuration for implementing the method according to the present invention.

Turning first to FIG. 1, a PBX 100 is shown connected via a two-wire local line 105 to a CO 110. A hybrid 120 converts the signals between two-wire line 105 (i.e. the loop start (LS) trunk line) and the four-wire lines 125 within the PBX 100. However, as discussed above, impedance mismatch between the two-wire line 105 and four-wire line 125 give rise to trans-hybrid echo. To that end, a bank of candidate impedance settings 130 may be selectively connected to the hybrid 120 for echo cancellation.

According to the present invention, a controller 150 method is provided for measuring how well each impedance setting matches the LS trunk line. After all of the candidate settings 130 have been tested, the controller 150 selects the impedance setting 130 with the highest merit.

Figure 2:
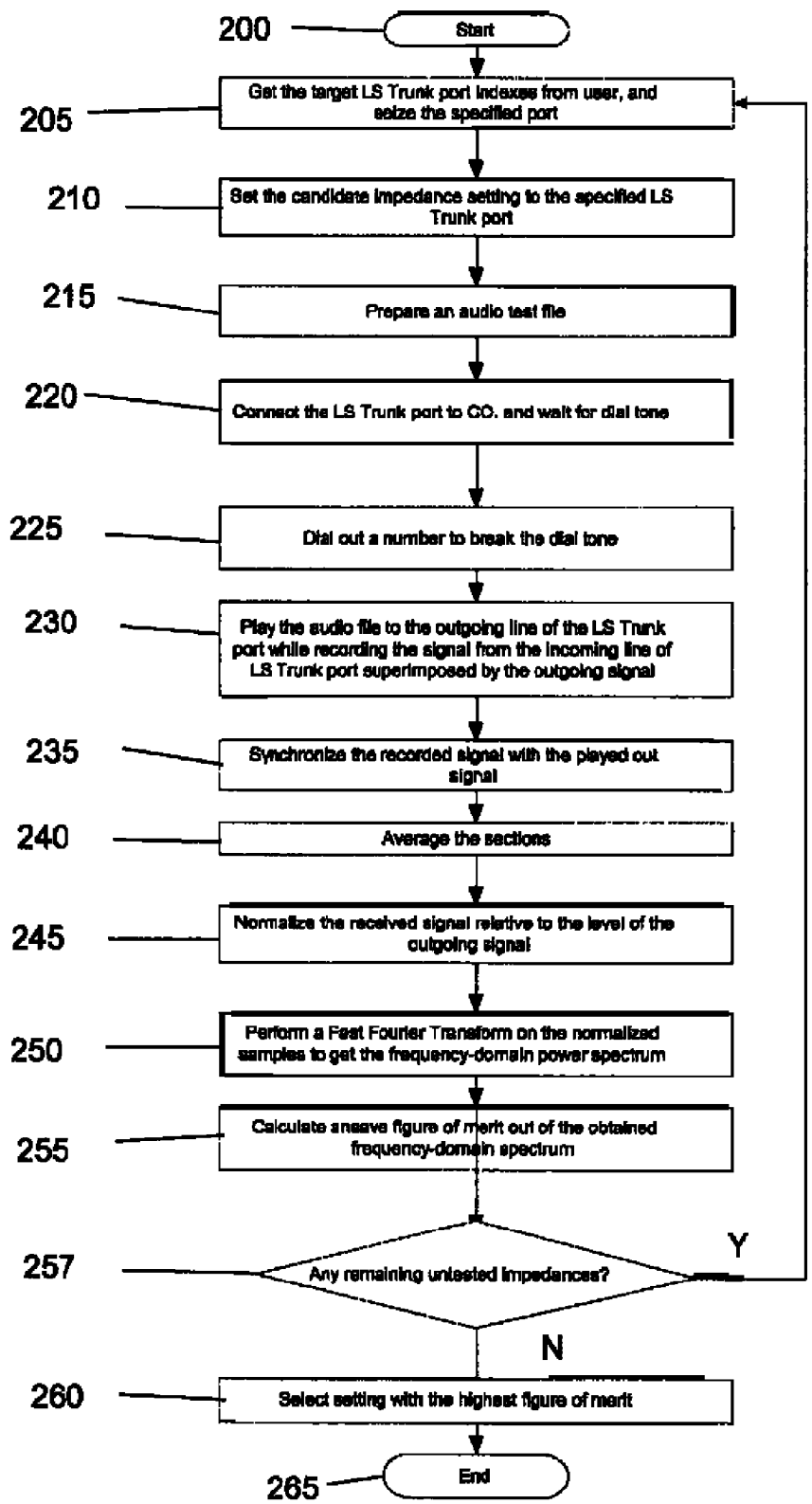
FIG. 2 is a flowchart of the method according to a preferred embodiment of the present invention.

Turning now to FIG. 2, the line measurement procedure of the preferred embodiment is set forth. First, the time-domain trans-hybrid transfer function is obtained as a measure of how well the impedance setting is matched (beginning at step 200). This involves the controller 150 retrieving the target LS trunk port indexes and seizing the specified port (step 205).

Then the candidate impedance setting 130 is applied to the specified LS trunk port (step 210).

Next, an audio test file is prepared (step 215). For example, the audio file may contain a number (e.g. 5) consecutive impulse signals spaced apart from one another (e.g. 200 ms apart). Preferably, the audio test signals are generated by a digital signal processor (DSP) 140.

The LS trunk port is then connected to the CO 110, and the controller 150 waits for dial tone (step 220).

Upon detection of dial tone, the controller 150 dials out a number (e.g. the CO silence termination number) to break the dial tone, and create silence on the line (step 225).

The DSP 140 then plays the audio file to the outgoing line 125 of the LS trunk interface (step 230), and at the same time controller 150 records the signal coming back from the incoming line 125 of the LS trunk interface, superimposed by the outgoing signal. The controller 150 then releases the LS trunk port.

The controller 150 then synchronizes the recorded signal with the played out signal by locating the impulses in the recorded signal (step 235). A predetermined number of audio samples are truncated after each impulse (e.g. in the preferred embodiment 128 samples are truncated, i.e. 16 ms).

Next, the consecutive sections of the recorded signal are averaged (e.g. averaging the five groups of samples to obtain a final audio sample). The outgoing signal is used for time synchronization purposes only. This averaging procedure (step 240) decreases the effect of random noise on the line as well as digital truncation error.

The controller 150 then normalizes the received signal relative to the level of the outgoing signal (step 245).

Steps 205 to 245 result in obtaining the time-domain trans-hybrid transfer function.

Next, a Fast Fourier Transform (FFT) is operated on the normalized samples to obtain the frequency-domain power spectrum (step 250), which is a representation of the trans-hybrid loss on the line. The power spectrum values are then converted to dB.

The controller 150 then calculates a figure of merit out of the obtained frequency-domain spectrum, wherein the average trans-hybrid loss and the flatness of the spectrum are important factors (step 255).

If any impedance settings 130 remain to be tested (a "Y" decision at step 257), then steps 205 to 255 are repeated.

After figures of merit have been calculated for all of the impedance settings, the impedance setting with the highest figure of merit is selected for application to the loop start (LS) trunk line (step 260), following which the process ends (step 265).

The following numerical example serves to illustrate the step of calculating a figure of merit (step 255) and selecting the highest figure of merit (step 260).

Let S(n) be the normalized power samples in the power spectrum, n=1 . . . 128. Because S(n) is symmetric, only the samples up to the middle place, i.e. 65, are needed. Then, B=max(S(n)), n=1 . . . 65, where B is the maximum peak in the spectrum, and where both S(n) and B are expressed in dB. It should be noted that since B is in dB, a positive B means positive gain (i.e. no echo return loss in the loop), which must be avoided.

The flatness and energy allocation between 300 Hz and 3300 Hz is then checked, which corresponds to the samples between 5 and 54. The average value $$A = \frac{1}{50}\sum_{n=5}^{54} S(n).$$

The flatness of the spectrum is calculated by the variance from the average value. The variance is biased to allow a roll-off, (i.e. lower frequencies slightly above the average value and higher frequencies slightly below the average value are preferred). In the preferred embodiment the cutover frequency is 2000 Hz, which is equivalent to index 33. In this example implementation the weights w1, w2, w3 and w4 are also equal to one. The modified variance value V is calculated as follows:

$$V = \sum_{n=5}^{54} w1 \times (S(n) - A)^2 + w2 \times (S(n) - A) \times \text{sign}(n - 33)).$$

The final merit $$\text{merit} = \begin{cases} -10000, & \text{if } (B > 0) \\ A^2 - (w3 \times B) - (w4 \times V), & \text{else.} \end{cases}$$

It will be appreciated that, although embodiments of the invention have been described and illustrated in detail, various modifications and changes may be made. For example, different numbers of impulse signals may be played out, and other, non-impulse test signals may be used to measure the time response Also, different techniques may be used to calculate the merit value. All such alternatives and modifications are believed to be within the scope of the invention as defined by the claims appended hereto.

What is claimed is:

1. A method of selecting an optimum impedance for the trans-hybrid echo path of a loop start trunk line, comprising:
   successively applying respective ones of a plurality of impedance settings to said loop start trunk line;
   for each of said impedance settings measuring the impulse response of said trans-hybrid echo path to obtain a time-domain trans-hybrid transfer function and deriving a frequency-domain spectrum representative of trans-hybrid loss, and then calculating figure of merit of the transfer function based on the power spectrum; and
   selecting as said optimum impedance one of said plurality of impedance settings associated with the highest calculated figure of merit.

2. The method of claim 1, wherein said measuring the impulse response of said trans-hybrid echo path comprises applying an audio signal containing at least one impulse to said loop start trunk line while simultaneously recording a return signal from the line, and locating said at least one impulse in the return signal.

3. The method of claim 2, further comprising normalizing the return signal relative to the audio signal for generating normalized samples corresponding to the time-domain trans-hybrid transfer function.

4. The method of claim 3, further comprising subjecting said normalized samples to a Fast Fourier Transform (FFT) for generating said frequency-domain power spectrum.

* * * * *